United States Patent [19]
Wimmenauer et al.

[11] Patent Number: 5,829,107
[45] Date of Patent: Nov. 3, 1998

[54] CLAMP ASSEMBLY

[75] Inventors: Michael J. Wimmenauer, Erie, Mich.; Bruce C. Miller, Curtice, Ohio

[73] Assignee: Ottawa Products, Co., Toledo, Ohio

[21] Appl. No.: 923,357

[22] Filed: Sep. 4, 1997

[51] Int. Cl.[6] .................................................. B65D 63/00
[52] U.S. Cl. .................................. 24/283; 24/278; 24/279
[58] Field of Search ........................... 24/283, 279, 278; 285/253

[56] References Cited

U.S. PATENT DOCUMENTS

| | | |
|---|---|---|
| 686,062 | 11/1901 | Hattely . |
| 802,213 | 10/1905 | Hight . |
| 1,214,308 | 1/1917 | Inglis et al. ................................ 24/283 |
| 1,268,934 | 6/1918 | Crabill et al. .............................. 24/283 |
| 1,806,867 | 5/1931 | Welsh ........................................ 24/279 |
| 2,093,210 | 9/1937 | Powell ...................................... 24/279 |
| 2,561,635 | 7/1951 | Prochaska ................................. 24/283 |
| 3,109,215 | 11/1963 | Brown . |
| 3,633,254 | 1/1972 | Hoglund . |
| 3,774,270 | 11/1973 | Bentley . |
| 4,365,392 | 12/1982 | Heckethorn . |
| 4,489,464 | 12/1984 | Massari et al. ............................ 24/283 |

FOREIGN PATENT DOCUMENTS

| | | | |
|---|---|---|---|
| 0528232 | 11/1921 | France ..................................... 24/283 |
| 0024362 | 6/1922 | France ..................................... 24/283 |
| 0185212 | 8/1922 | United Kingdom ..................... 24/279 |
| 0541613 | 12/1941 | United Kingdom ..................... 24/283 |

*Primary Examiner*—Victor N. Sakran
*Attorney, Agent, or Firm*—David C. Purdue; John C. Purdue

[57] ABSTRACT

A clamp assembly having two side-by-side loops with inner peripheries for engaging the exterior of a part to be clamped, a body part, a tightening member, and means for releasably locking the tightening member at each of a plurality of longitudinal positions relative to a channel or shoulder of the body part or of the tightening member is disclosed. The body part is structurally integral with first adjacent ends of the two loops, while the tightening member is structurally integral with second adjacent ends of the two loops which are opposed to the first adjacent ends. One of the tightening member and the body part has a portion which is slidably received in a longitudinally extending channel which extends through the other. The relationships among the channel, the slidably received portion of the body part or of the tightening member, the tightening member and the loops are such that the size of the loops depends upon the relative longitudinal positions of the central part and of the channel.

4 Claims, 1 Drawing Sheet

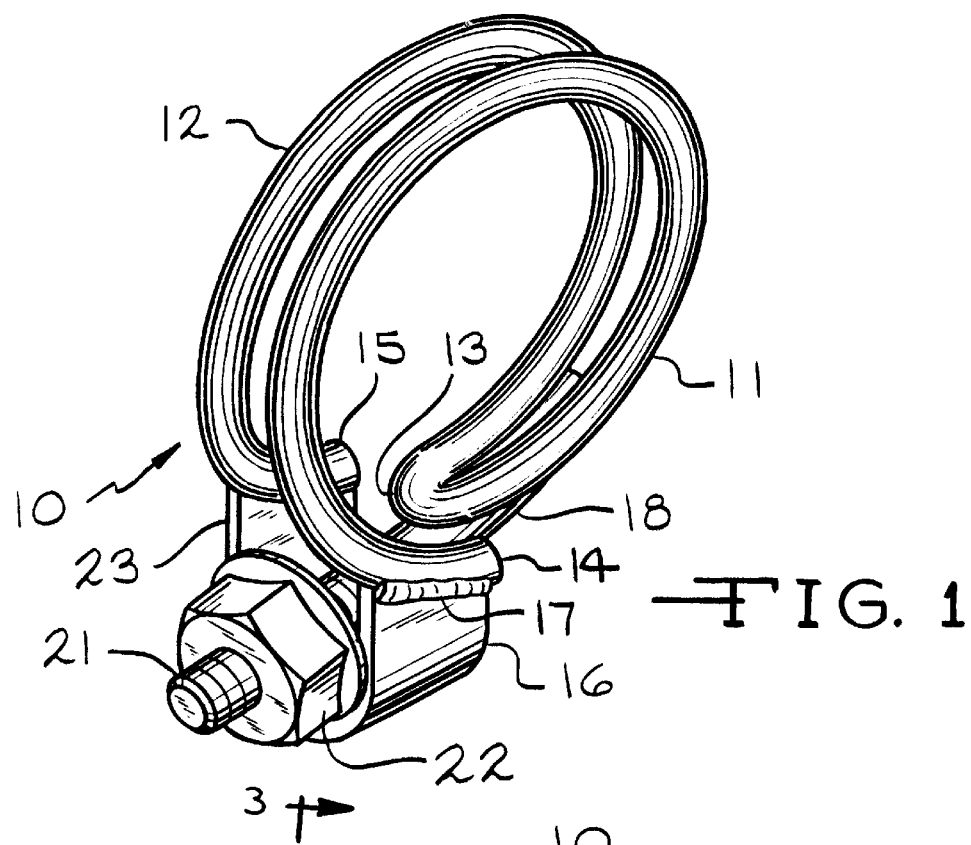
FIG. 1
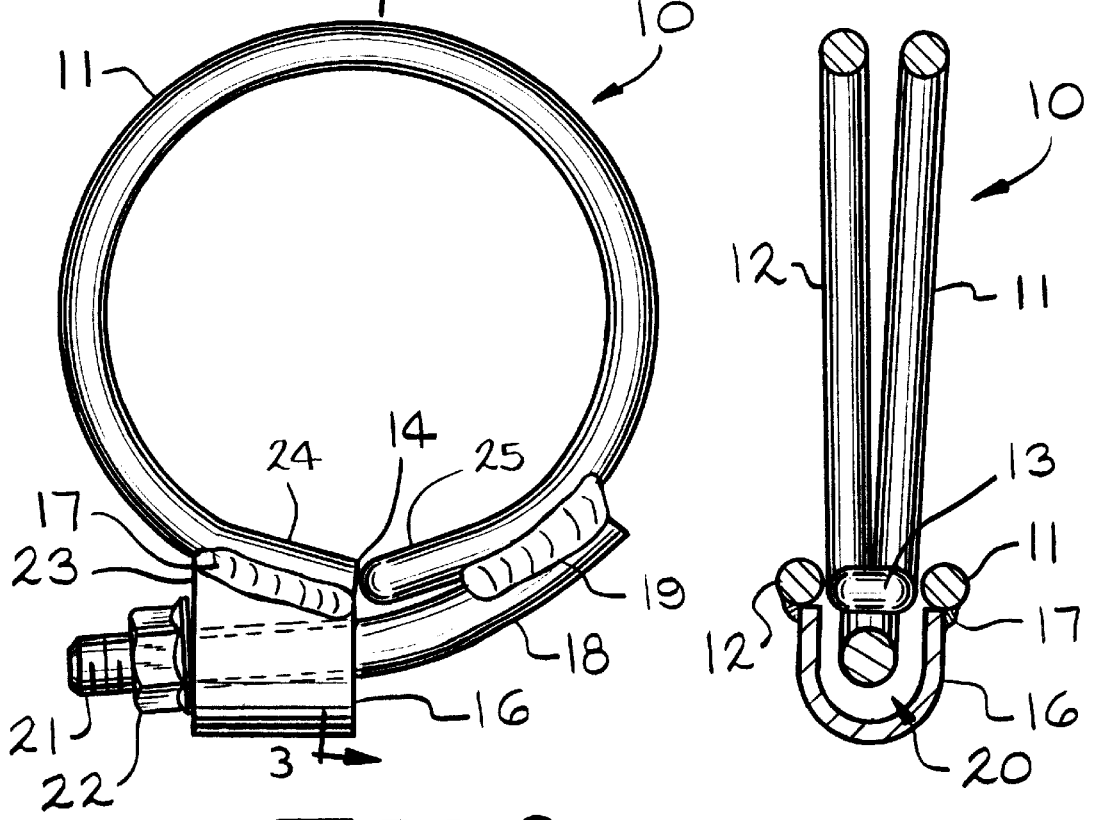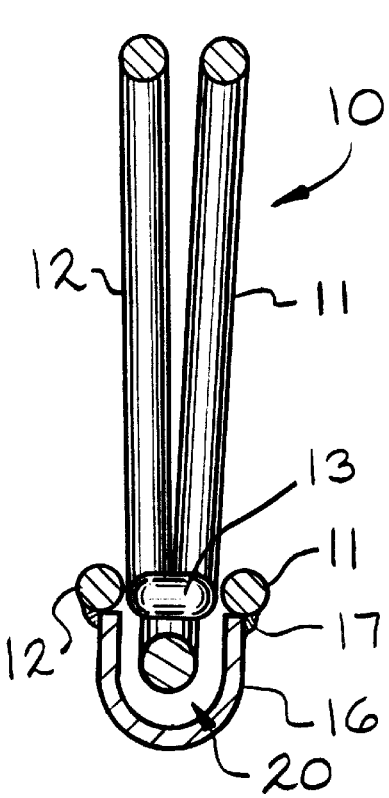
FIG. 2     FIG. 3

CLAMP ASSEMBLY

FIELD OF THE INVENTION

This invention relates to a clamp assembly and, in particular, to such an assembly having two side by side loops with inner peripheries for engaging the exterior of a part to be clamped, especially a section of hose, pipe, tubing or the like.

BACKGROUND OF THE INVENTION

Various clamp assemblies which comprise a single loop of wire or rod and means for increasing and decreasing the diameter of the loop so that the loop can be slipped over a part to be clamped, e.g., a length of pipe or tubing or telescoping lengths of tubing, and the diameter of the loop can be decreased so that the part is engaged firmly have been suggested. In some cases, the clamps have also included a member which can be attached to a vehicle or other article to mount the clamps and the parts being clamped. The following U.S. patents disclose such clamps:

Hattely, No. 686,062, Nov. 5, 1901;
Hight, No. 802,213, Oct. 17, 1905;
Powell, No. 2,093,210, Sep. 14, 1937;
Brown, No. 3,109,215, Nov. 5, 1963;
Hoglund et al., No. 3,633,254, Jan. 11, 1972;
Bentley, No. 3,774,270, Nov. 27, 1973
Heckethorn, No. 4,365,392 Dec. 28, 1982.

So far as is known, however, the prior art does not suggest a clamp assembly comprising two side-by-side loops having inner peripheries for engaging the exterior of a tube or other part to be clamped. Moreover, the prior art clamps for pipes and hoses suffer from their inability to apply uniform clamping forces to such pipes and hoses.

SUMMARY OF THE INVENTION

The instant invention is a clamp assembly comprising two side-by-side loops having inner peripheries for engaging the exterior of a part to be clamped, a body part, a tightening member, and means for releasably locking the tightening member at each of a plurality of longitudinal positions relative to a channel or shoulder of the body part or of the tightening member. The body part is structurally integral with first adjacent ends of the two rods, while the tightening member is structurally integral with second adjacent ends of the two rods which are opposed to the first adjacent ends. A portion of one of the tightening member and the body part has a central part which is slidably received in a longitudinally extending channel which extends through the other. The relationships among the channel, the central part of the body part or of the tightening member, the tightening member and the two side-by-side loops are such that the diameter of the loops depends upon the relative longitudinal positions of the central part and of the shoulder or channel.

OBJECTS OF THE INVENTION

It is an object of the instant invention to provide an improved pipe clamp assembly.

It is a further object of the present invention to provide such a clamp which applies a uniform pressure around the exterior periphery of an article to be clamped.

It is another object of the present invention to provide a clamp which is especially suited for clamping one component of an exhaust system to another.

It is another object of the invention to provide an exhaust clamp which will provide a seal between exhaust system components that will stand up to vibration without leaking.

Other objects and advantages will be apparent from the description which follows and from the appended drawings.

BRIEF DESCRIPTION OF THE DRAWINGS

FIG. 1 is a perspective view showing a clamp assembly according to the instant invention.

FIG. 2 is a side elevational view of the clamp assembly of FIG. 1.

FIG. 3 is a view in vertical section taken along the line 3—3 of FIG. 2.

DESCRIPTION OF THE PREFERRED EMBODIMENT

A clamp assembly according to the invention is indicated generally at 10 in FIGS. 1, 2 and 3. The assembly 10 comprises two side-by-side loops, 11 and 12, each having an inner periphery for engaging the exterior of a part to be clamped. In the embodiment of the invention shown, the loops 11 and 12 are composed of a single piece of stock which has been formed to the shape that can be seen best in FIG. 1, and are joined as indicated at 13. The side by side loops diverge from the point 13 to ends 14 and 15. The divergence is enough that the joined ends fit between the ends 14 and 15 (see, in particular, FIG. 3).

As clearly illustrated in FIG. 1, the inner peripheries of the loops 11 and 12 extend all the way to the free ends 14 and 15 so that they would engage a portion of a surface of a part to be clamped (not shown) when the clamp 10 is in use. In other words, the loops 11 and 12, including the free ends 14 and 15, are configured so that they circumscribe a part to be clamped.

The assembly 10 also includes a body part 16 to which the loops 11 and 12, adjacent the ends 14 and 15, are welded or otherwise attached, as indicated at 17, and a tightening member 18 to which the loops 11 and 12, adjacent the point 13 where they are joined, are welded or otherwise attached, as indicated at 19 in FIG. 2. A portion of the tightening member 18 is slidably received in and extends through a channel 20 in the body part 16. That portion of the tightening member 18 is threaded, as indicated at 21 in FIGS. 1 and 2, and carries a flanged nut 22. When the nut 22 is turned clockwise (FIG. 1), it coacts with a shoulder 23 of the body part 16 whereby the tightening member 18 is moved to the left in FIG. 2, causing the diameter of the loops 11 and 12 to decrease. Because the joined ends of the loops 11 and 12 fit between the ends 14 and 15, there is no lateral component of force when the nut 22 is turned. The rods 11 and 12 are sized for a particular part to be clamped, such as a hose, pipe or the like (not shown), so that they are stressed slightly as the nut 22 is turned to decrease the diameter of the loops 11 and 12 before the part to be clamped is engaged. As a consequence, when the part is engaged by the assembly 10, and the nut 22 is turned counter clockwise (in FIG. 1) the stress in the loops 11 and 12 is relieved, and their diameter increases to free the part.

It is preferred that the loops 11 and 12 have interior surfaces that are round although slight deviations from roundness can be tolerated, such as the flat areas 24 and 25 which are adjacent to the ends 13 and 14 of the loops.

It will be appreciated that various changes and modifications can be made from the specific details of the invention as shown in the attached drawings and described with reference thereto without departing from the spirit and scope thereof as defined in the attached claims. For example, the body part 16 can be changed to have a central part (not illustrated) which is received in a channel (not illustrated) of the tightening member 18, and a nut can be used to decrease and increase the diameter of the loops 11 and 12. Similarly, while it is convenient during fabrication and assembly for the rod from which the loops 11 and 12 are formed of a single piece of stock, connected as indicated at 13, and this is preferred, such connection is not necessary after the rods are welded or otherwise attached to the tightening member 18. Excellent results have been achieved where the loops 11 and 12 are formed of single piece of 1018 steel. Other materials may be use, of course. Other changes and modifications will be apparent to those skilled in the art.

I claim:

1. A clamp assembly comprising two side by side loops having inner peripheries for engaging the exterior of a part to be clamped, said loops being formed from a single piece of stock and having a joined end and first and second free ends, wherein said joined end is positioned between said free ends and said free ends are positioned to engage a portion of a surface of a part to be clamped, a body part defining a channel and secured to each of said loops, adjacent said first and second free ends, a tightening member secured to said joined end and including a portion which is slidably received in said channel, and locking means for releasably locking said tightening member at each of a plurality of longitudinal positions relative to the channel defined by said body part wherein the size of said loops is determined by the relative longitudinal positions of said channel and said lightening member.

2. A clamp assembly as claimed in claim 1 wherein said portion of said tightening member extends through and beyond said channel of said body part, and said locking means is threadably engagable with the portion of said portion of said tightening member which extends beyond the channel of said body part.

3. The clamp assembly claimed in claim 1 wherein said tightening member is welded to said loops adjacent to said joined end.

4. The clamp assembly claimed in claim 1 wherein said body part is not next to said inner peripheries of said loops.

* * * * *